UNITED STATES PATENT OFFICE.

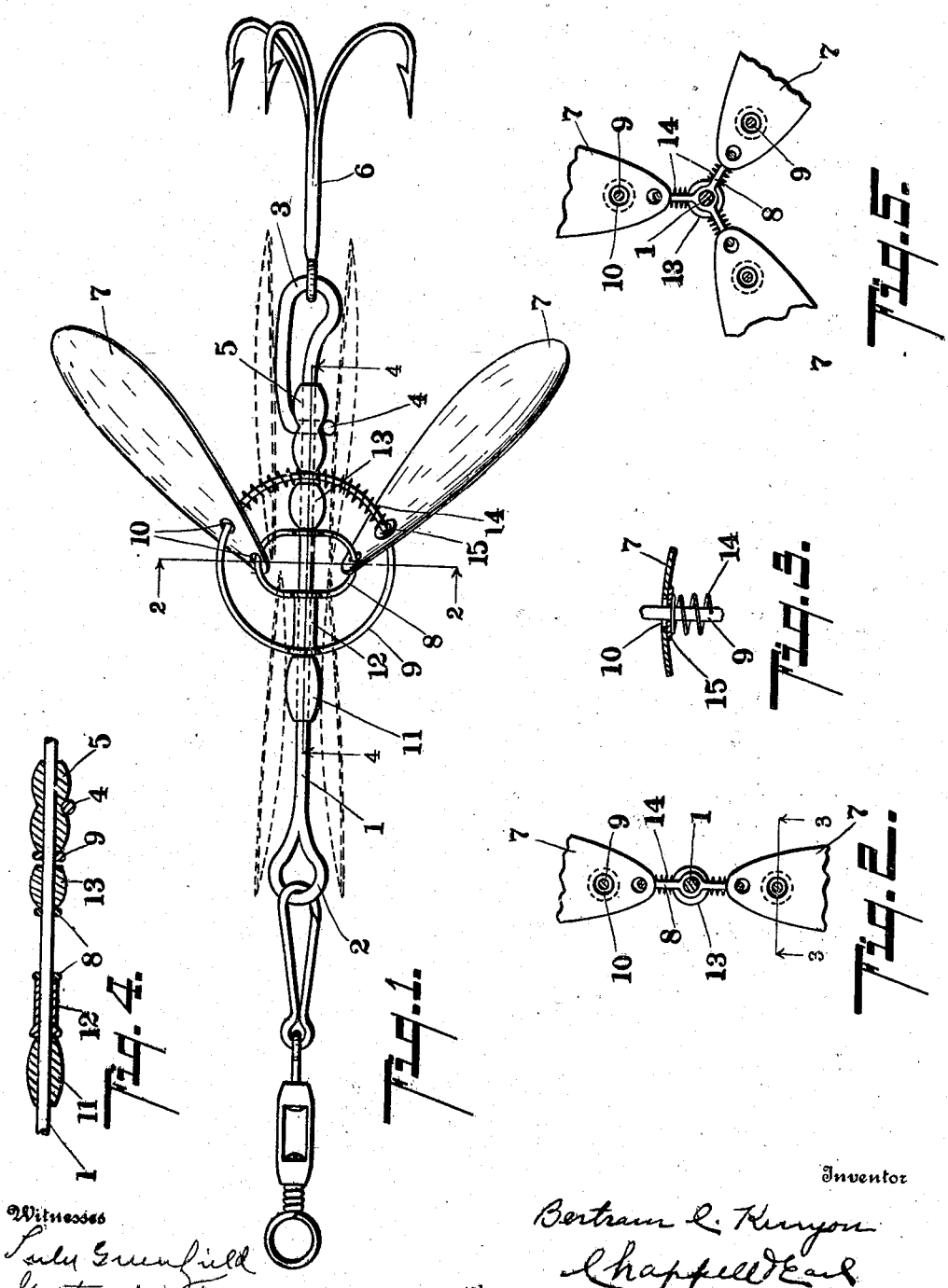

BERTRAM C. KENYON, OF MISHAWAKA, INDIANA, ASSIGNOR TO WILLIAM SHAKESPEARE JR. COMPANY, OF KALAMAZOO, MICHIGAN.

FISH BAIT OR LURE.

No. 923,854.      Specification of Letters Patent.      Patented June 8, 1909.

Application filed April 24, 1908. Serial No. 429,028.

*To all whom it may concern:*

Be it known that I, BERTRAM C. KENYON, a citizen of the United States, residing at Mishawaka, Indiana, have invented certain new and useful Improvements in Fish Baits or Lures, of which the following is a specification.

This invention relates to improvements in fish baits or lures.

My improvements relate particularly to the class of fish baits or lures commonly known as "spoon" baits, although applicable to other baits.

The main objects of this invention are: first, to provide an improved fish bait having a plurality of spoons adapted to rotate in the same plane; second, to provide an improved fish bait in which the spoons are supported so that they balance when rotating; third, to provide an improved fish bait in which the spoons are held yieldingly outward; fourth, to provide an improved fish bait which may be effectively used in casting,—that is, one which does not sail or is not deflected by the spoons when passing through the air; fifth, to provide an improved fish bait in which the spoons act with an arrow or guiding effect when the bait is thrown through the air, as in casting; and sixth, to provide an improved fish bait in which the spoons serve as guards for the hooks.

Further objects, and objects relating to structural details, will definitely appear from the detailed description to follow.

I accomplish the objects of my invention by the devices and means described in the following specification.

The invention is clearly described and pointed out in the claims.

A structure embodying the features of my invention is clearly illustrated in the accompanying drawing, forming a part of this specification, in which:

Figure 1 is an elevation view of a structure embodying the features of my invention, the spoons being shown in their folded or collapsed positions by dotted lines; Fig. 2 is a detail cross section, taken on a line corresponding to line 2—2 of Fig. 1; Fig. 3 is an enlarged detail section taken on a line corresponding to line 3—3 of Fig. 2; Fig. 4 is a detail longitudinal section taken on a line corresponding to line 4—4 of Fig. 1; and, Fig. 5 is a detail cross section corresponding to that of Fig. 2, showing a modification, the structure being adapted for three spoons instead of two, as shown in the other figures.

In the drawing, similar reference characters refer to similar parts throughout the several views, and the sectional views are taken looking in the direction of the little arrows at the ends of the section lines.

Referring to the drawing, I provide a spindle 1, preferably having an eye 2 at its forward end and a hook securing loop 5 at its rear end, the loop being provided with a laterally turned hook portion 4 at its end adapted to engage over the collar 5 upon the spindle. The central portion of this collar is preferably reduced to receive the hook 4, as illustrated, and the hook is adapted to prevent the movement of the collar upon the spindle.

The fish hook 6 may be, it is obvious, of any desired style. The spoons 6 are revolubly mounted upon the spindle, preferably by means of a pair of ring-like swivels 8 and 9, the outer ring being designed to yieldingly support the spoons in proper position. These swivel members 8 and 9 are preferably arranged one within the other, as illustrated, between the bead-like collars 5 and 11. The spacing sleeves 12 and 13 are arranged between the members 8 and 9, the sleeve 12 being, in the structure illustrated, shown attached to the outer member 9. The holes 10 in the spoons are of such size as to permit the spoons to adjust themselves freely on the members and also to twist or rock thereon when in use. By thus supporting the spoons, they are free to collapse against the spindle, as is illustrated, by dotted lines in Fig. 1 of the drawing. They are held normally outward by means of the coiled springs 14 arranged on the support 9. Suitable washers, as 15, are preferably arranged on the under side of the spoons to prevent the springs working through the openings 10.

In the modified structure shown in Fig. 5, the supports for the spoons are tripled instead of being duplicated, as in Fig. 1. It is obvious that any number of spoons may be used as they are, by the supporting members 9, prevented from becoming entangled.

The spoons are of substantially the same pitch so that they rotate in substantially the same plane. When the bait is thrown swiftly through the air, the spoons fold back and serve to guide rather than to deflect the bait or cause it to soar. The spoons, being held yieldingly outward, serve to guard the hook.

With my invention applied to the structure I have illustrated, I find that in practice the spoons will rotate first in one direction and then in the other; that is, that the direction of rotation will alternate when being drawn through the water for any considerable distance. I am, however, unable to state with certainty the reason for this result.

In practice, I preferably form the spacing beads 12 and 13 of such length that axial movement of the swivel ring 8 on the spindle relative to the support ring 9 is permitted, the swivel rings being centrally of the support when its forward end is against the bead 12, and being out of center when its rear end is against the bead 13.

Having thus described my improved bait in detail in the form preferred by me on account of its structural simplicity and economy, I am aware, however, that it is capable of very great variation in structural details without departing from my invention, and I desire to be understood as claiming the same specifically, as illustrated, as well as broadly.

Having thus described my invention what I claim as new and desire to secure by Letters Patent, is:

1. In a fishing bait, the combination with a spindle of a plurality of spoons; a pair of ring-like spoon supporting members of different diameters, arranged one within the other; spacing sleeves for said supporting members, said members and sleeves being revolubly mounted on said spindle; a pair of collars on said spindle between which said supporting members are mounted; and coiled springs arranged on one of the supporting members to hold said spoons yieldingly outward.

2. In a fishing bait, the combination with a spindle of a plurality of spoons; a pair of ring-like spoon supporting members of different diameters arranged one within the other to revolve on said spindle and coiled springs arranged on one of the supporting members to hold said spoons yieldingly outward.

3. In a fishing bait, the combination with a spindle, of a plurality of spoons; a pair of ring-like spoon supporting members of different diameters arranged one within the other to revolve on said spindle; and coiled springs arranged on one of the supporting members to hold said spoons yieldingly outward.

4. In a fishing bait, the combination with a spindle, of a plurality of spoons; a pair of ring-like supporting members for said spoons, each spoon being loosely mounted on both supporting members, said supporting members being of different diameters and arranged one within the other to revolve on said spindle; spacing sleeves for said supporting members revolubly mounted on said spindle; and a pair of collars on said spindle between which said supporting members are mounted.

5. In a fishing bait, the combination with a spindle, of a plurality of spoons; and a pair of ring-like supporting members for said spoons, each spoon being loosely mounted on both supporting members, said supporting members being of different diameters and arranged one within the other to revolve on said spindle.

6. In a fishing bait, the combination with a spindle of a plurality of spoons; a pair of spoon supporting members of different diameters arranged one within the other to revolve on said spindle, said members being capable of partial independent rotation; and springs arranged on one of said supporting members to hold said spoons yieldingly outward.

7. In a fishing bait, the combination with a spindle, of a plurality of spoons; and a pair of spoon supporting members of different diameters arranged one within the other to revolve on said spindle, said members being capable of partial independent rotation.

8. In a fishing bait, the combination with a spindle, of a plurality of spoons; a pair of supporting members on which said spoons are loosely mounted, said supporting members being of different diameters and arranged one within the other to revolve on said spindle; and springs arranged on one of said supporting members to hold said spoons yieldingly outward.

9. In a fishing bait, the combination with a spindle, of a plurality of spoons; and a pair of supporting members on which said spoons are loosely mounted, said supporting members being of different diameters and arranged one within the other to revolve on said spindle.

10. In a fish bait, the combination with a spindle, of a plurality of spoons of the same pitch swiveled upon said spindle to rotate in the same relative position thereon; a spacing member arranged to engage said spoons for holding them in a spaced relation, said spoons being loosely connected so that they may tilt freely on their swiveled connection and said spacing member; and means for holding said spoons yieldingly outward.

11. In a fish bait, the combination with a spindle, of a swivel mounted thereon; a spoon connected at its inner end to said swivel; and a support swiveled on said spindle and disposed through said spoon at a point outside of its connection to said spindle; and a coiled spring arranged on said support adapted to hold said spoon yieldingly outward.

12. In a fish bait, the combination with a spindle, of a swivel mounted thereon; a spoon connected at its inner end to said swivel; and a support swiveled on said spindle and disposed through said spoon at a point outside of its connection to said spindle.

13. The combination with a spindle, of a swivel; a plurality of spoons loosely connected to said swivel to fold forwardly or backwardly against the spindle; means for maintaining said spoons in a spaced relation, consisting of a member disposed through said spoons; and means for holding said spoons yieldingly outward.

14. The combination with a spindle, of a swivel; a plurality of spoons loosely connected to said swivel to fold forwardly or backwardly against the spindle; and means for maintaining said spoons in a spaced relation, consisting of a member disposed through said spoons.

15. The combination with a spindle, of a plurality of spoons; and connections for said spoons to said spindle, whereby they are permitted to revolve about the spindle in substantially the same relative position and are permitted to twist whereby their direction of revolution may be changed.

16. The combination with a spindle, of a plurality of spoons; a pair of ring-like supporting members on which said spoons are loosely mounted, the said supporting members being of different diameters, arranged one within the other to revolve on said spindle; and spacing members for said supporting members arranged on said spindle, said spacing members being adapted to permit of longitudinal movement of the inner supporting member on the spindle relative to the outer supporting member.

17. The combination with a spindle, of a plurality of spoons; a swivel for connecting said spoons to said spindle, said spoons being adapted to rotate in the same relative position on said spindle; a curved supporting member for said spoons, said spoons being loosely arranged on said supporting member, said swivel being capable of longitudinal movement on said spindle relative to and independently of said curved supporting members.

18. In a fish bait, the combination with a spindle, of a plurality of spoons; a supporting member for said spoons whereby they are held in a spaced relation and permitted to swing to and from said spindle; means for holding said spoons yieldingly outward on said support; and a swivel connection for the inner ends of said spoons to said spindle, said swivel connection being arranged within said support and being capable of longitudinal movement on said spindle relative thereto.

19. In a fish bait, the combination with a spindle, of a plurality of spoons; a supporting member for said spoons whereby they are held in a spaced relation and permitted to swing to and from said spindle; and a swivel connection for the inner ends of said spoons to said spindle, said swivel connection being arranged within said support and being capable of longitudinal movement on said spindle relative thereto.

20. The combination with a spindle, of a plurality of spoons; a swivel connection for the inner ends of said spoons to said spindle; and a support therefor disposed through said spoons at the outside of their connection to said spindle, said spoons being loosely mounted on said swivel and on said support, whereby they are permitted to swing outwardly and to twist laterally thereon.

21. The combination with a spindle, of a plurality of spoons; and connections for said spoons to said spindle whereby they are supported to revolve in substantially the same position relative to the spindle and permitted to change their direction of revolution.

22. The combination with a rod-like spindle having a hook securing loop at its rear end, said loop being formed by turning said rod upon itself and having a laterally-turned hook at its end; a bead-like collar on said spindle, having a reduced portion over which the laterally turned end of said loop is adapted to engage; and a spoon revolubly mounted on said spindle in front of said collar.

In witness whereof, I have hereunto set my hand and seal in the presence of two witnesses.

BERTRAM C. KENYON. [L. S.]

Witnesses:
  GEO. B. SAWDON,
  HARRY A. EDRIS.